A. C. FOSTER.
GRAIN RECLEANER FOR THRESHING MACHINES.
APPLICATION FILED NOV. 17, 1909.
1,056,527. Patented Mar. 18, 1913.
3 SHEETS—SHEET 1.
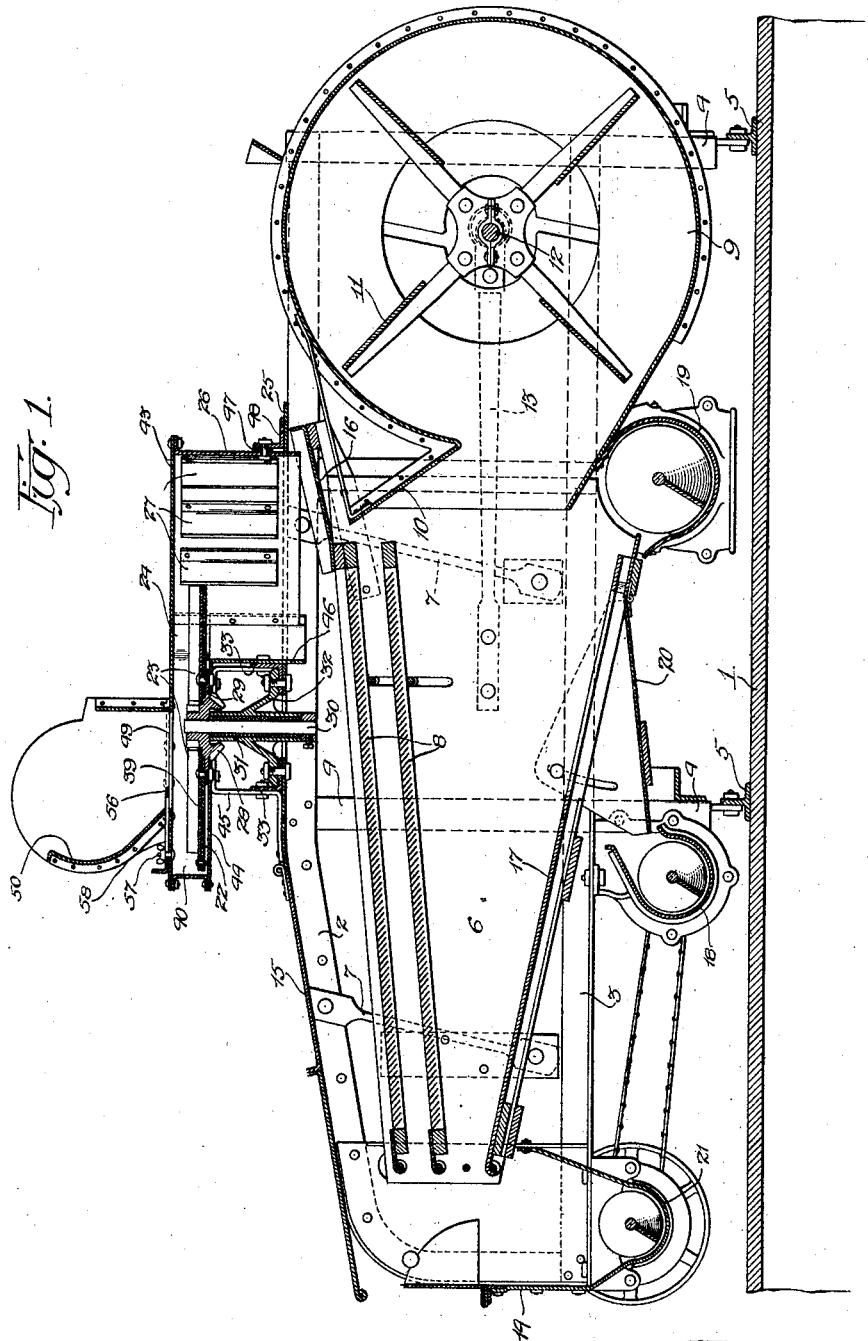

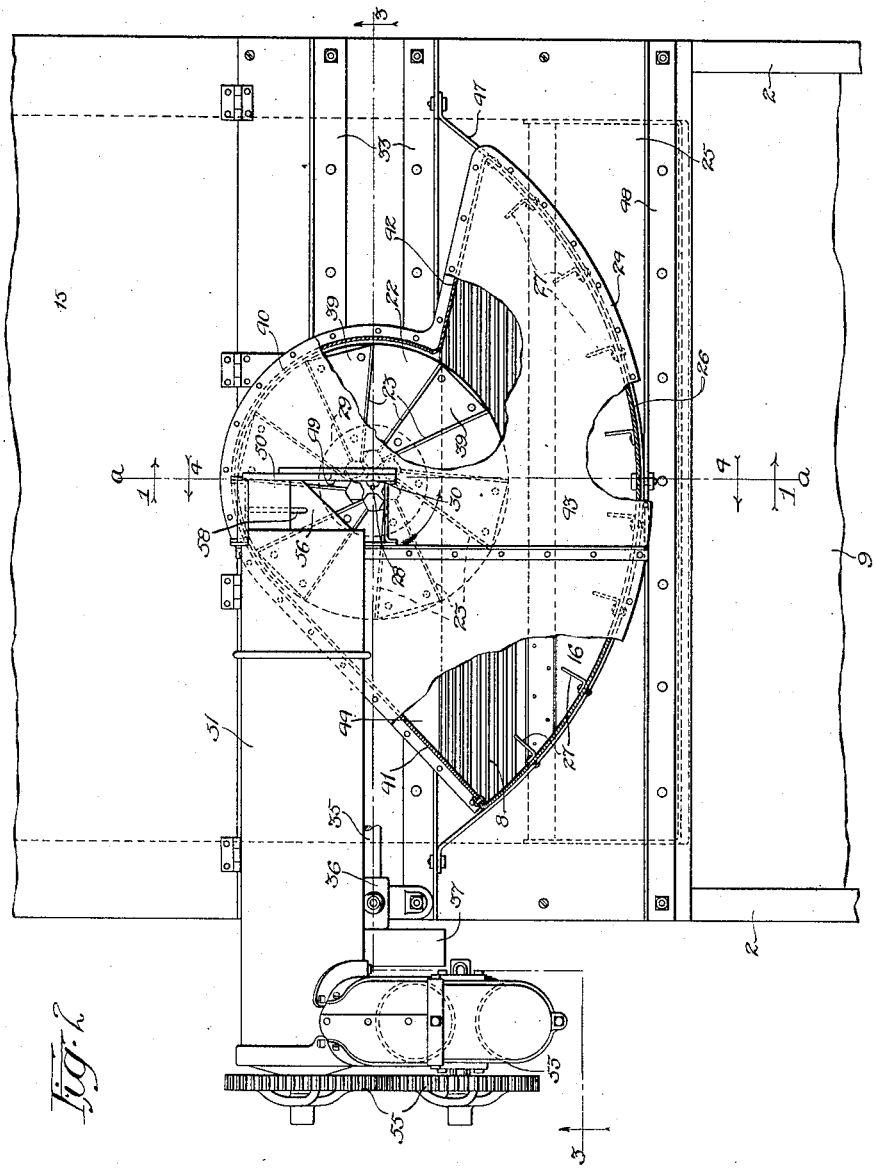

A. C. FOSTER.
GRAIN RECLEANER FOR THRESHING MACHINES.
APPLICATION FILED NOV. 17, 1909.
1,056,527.
Patented Mar. 18, 1913.
3 SHEETS—SHEET 3.
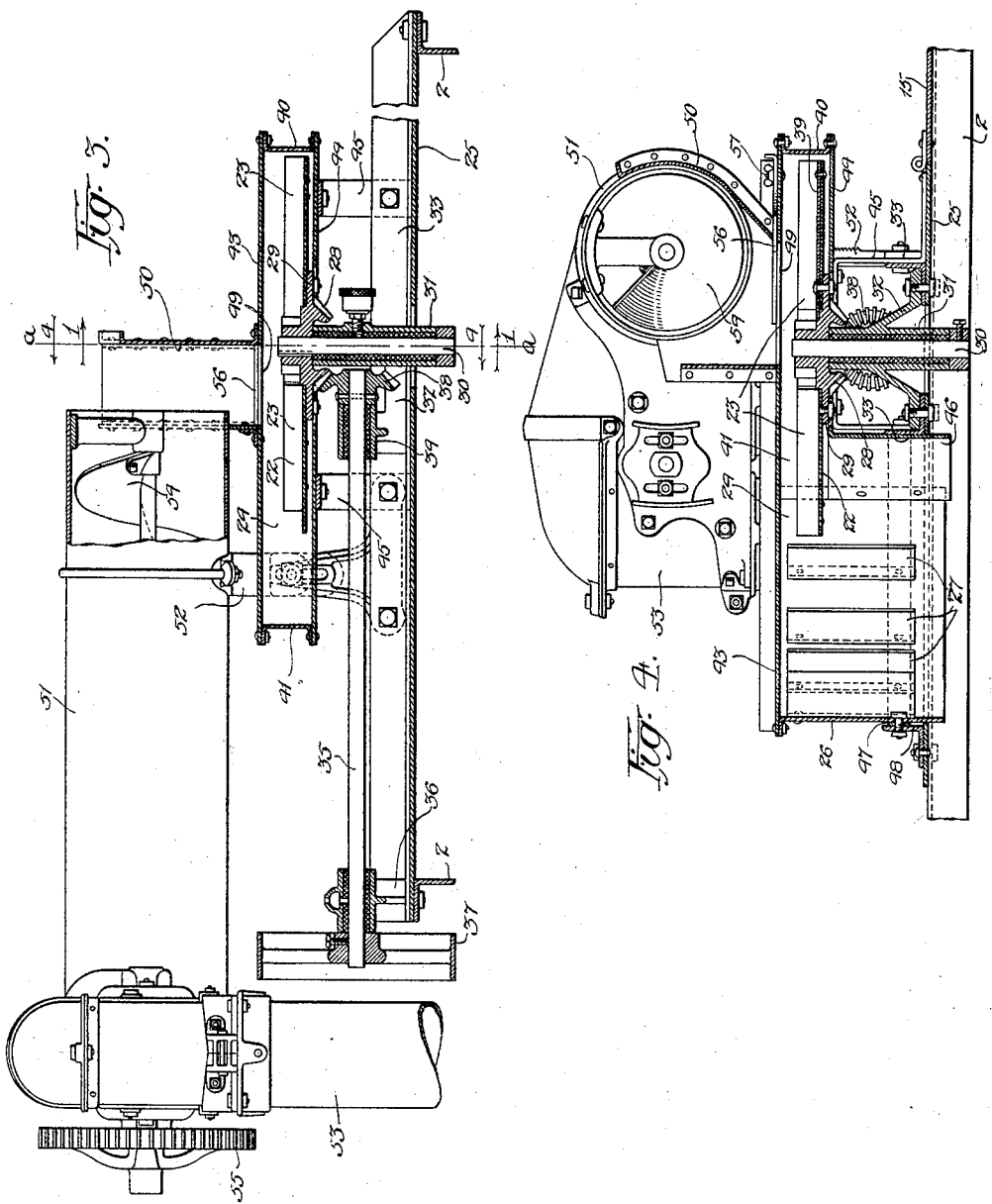
Witnesses:
Frank W. Bemm
Clara A. Morton
Inventor
Alva C. Foster
by Peirce & Fisher
Attys.

UNITED STATES PATENT OFFICE.

ALVA C. FOSTER, OF RACINE, WISCONSIN, ASSIGNOR TO J. I. CASE THRESHING MACHINE COMPANY, OF RACINE, WISCONSIN, A CORPORATION.

GRAIN-RECLEANER FOR THRESHING-MACHINES.

1,056,527. Specification of Letters Patent. Patented Mar. 18, 1913.

Application filed November 17, 1909. Serial No. 528,516.

*To all whom it may concern:*

Be it known that I, ALVA C. FOSTER, a citizen of the United States, and a resident of Racine, county of Racine, and State of Wisconsin, have invented certain new and useful Improvements in Grain-Recleaners for Threshing-Machines, of which the following is a specification.

The invention relates to grain recleaners for threshing machines and seeks to provide simple and effective means for receiving the grain from the grain elevator of the separator or threshing machine and uniformly distributing the same across the front end of the recleaner sieve, so that the sieve and fan can effectively operate to clean the grain.

Other devices, such as a series of deflectors and cross-conveyers have been used to distribute the grain to the sieve of a recleaner for a threshing machine. Deflectors cannot be readily adapted or adjusted to meet the different conditions under which the recleaner must operate. Such conditions are the variation in the weight and moisture of the grain and the varying amount delivered to the recleaner by the threshing machine. With cross-conveyers, the openings in the bottom of the conveyer trough must be frequently adjusted to meet these varying conditions.

The present invention seeks to provide a construction which will effectively and uniformly distribute the grain over the recleaner sieve in spite of the varying conditions of the grain as to weight and amount of moisture present, and in spite of the varying quantity delivered to the recleaner by the threshing machine, and which requires little or no attention or adjustment.

The invention consists in the features of improvement hereinafter pointed out, illustrated in the preferred form in the accompanying drawings and more particularly pointed out in the appended claims.

Figure 1 is a longitudinal section through the improved recleaner for threshing machines, the section being taken on the lines *a—a* of Figs. 2 and 3 looking in the direction of the arrows 1—1. Fig. 2 is a plan view of the upper portion of the recleaner illustrating the distributing device, with parts of the housing therefor broken away to show its inner construction. Fig. 3 is a transverse section of the distributer taken on the line 3—3 of Fig. 2. Fig. 4 is a longitudinal section thereof taken on the lines *a—a* of Figs. 2 and 3 and looking in the direction of the arrows 4—4.

The recleaner is mounted upon the roof or deck 1 of the threshing machine. Its frame comprises upper and lower longitudinal bars 2 and 3 connected by vertical bars 4. The vertical frame bars 4 are secured at their lower ends to the transverse deck beams 5 of the threshing machine. A cleaning shoe 6 of any suitable construction is arranged within the frame of the recleaner. In the form shown, the shoe 6 is suspended from the frame by spring-arms 7 and is provided at its upper portion with two sieves 8 which are adjustably supported in any suitable manner. A transverse fan casing 9 at one end of the recleaner, is provided with a mouth portion 10 opening into the end of the shoe and with a fan 11, mounted on a transverse shaft 12, which serves to direct a blast of air into the shoe and upwardly through the sieves thereof. A shaking motion is imparted to the sieves by means of eccentric rods 13 connected thereto and driven from the shaft 12.

The recleaner is provided with an end wall 14 and a top wall 15 that are preferably hinged to afford access to the sieves. At its upper, front end, the shoe is provided with an inclined receiving board 16 from which the grain passes onto the upper or front end of the sieves. The sieves 8 are inclined downwardly from the front to the rear end of the shoe and the grain passing over and through the same is cleaned by the blast of air from the fan passing through the shoe and upwardly through the sieves. The grain falling through the sieves drops onto the oppositely inclined bottom 17 of the shoe and passes therefrom into one or the other of a pair of grain augers or conveyers 18 and 19 in accordance with the position of a deflector plate 20 located at the lower end of the shoe bottom 17. The chaff and dirt from the sieves passes into a cross-conveyer 21.

The parts thus far described constitute the usual recleaner construction. In order that the recleaner sieves and fan shall act effectively, it is necessary that the grain should be uniformly distributed upon the sieves and, since the recleaner takes the grain direct from the threshing machine, this uniform distribution must be effected in spite of the varying quality and quantity of the grain delivered thereto by the threshing machine.

The present improved distributing apparatus comprises a horizontal, revolving disk 22 arranged above the front end of the recleaner shoe and having a series of vanes or ribs 23 on its upper surface which are slightly inclined to the radii of the disk and to the direction of rotation. The disk is fitted about with a housing 24 opening at its bottom on its delivery side through the top plate 25 of the recleaner and having a vertically disposed, segmental, delivery side wall baffle plate 26 which extends transversely above the front end of the recleaner shoe and sieves thereof. The delivery side wall 26 is provided with a series of vertical, inwardly projecting, deflecting strips 27 and the width of the delivery side wall of baffle plate is slightly less than that of the recleaner sieve, as shown in Fig. 2. The distributer disk is rotated in the direction of the arrow, shown in Fig. 2, and the grain is fed thereto on one side of and adjacent its center in such a manner that it will be projected by centrifugal force from the disk and thrown against the baffle plate or wall 26 and thus be caught by the strips or deflectors 27 and allowed to drop upon the receiving board 16 and the front end of the sieve 8 of the recleaner shoe.

In the form shown, the distributer disk 22 is provided with a central opening within which is arranged the hub of a beveled gear 28, the disk being secured to and supported by a flange 29 on the gear. The gear is keyed to the upper end of a short vertical shaft 30 that is journaled within a suitable bearing sleeve 31 on a bracket 32. This bracket is supported upon a pair of transverse angle-bars 33 extending across the top of the recleaner and connected at their ends to the top side-bars 2 thereof. The bracket 32 has a horizontal bearing 34 within which the inner end of a horizontal shaft 35 is journaled. The outer end of this shaft is journaled in a bracket 36 and is provided with a pulley 37 from which the shaft is driven from one of the driving shafts of the threshing machine. At its inner end, the shaft 35 is provided with a beveled gear 38 which meshes with the beveled gear 28 to rotate the distributer disk in the direction of the arrow indicated in Fig. 2. The ribs 23 on the upper face of the distributer disk, in the form shown, are formed by the upturned edges of a set of triangular plates 39 which are secured to the upper face of the distributer disk.

On the side opposite the delivery wall 26, the housing 24 is provided with a narrow, segmental portion 40 which forms a sort of fan casing within which the distributer disk is fitted. This narrow segmental portion is connected to the delivery side wall 26 by a tangential wall 41 on one side and an inclined wall 42 on the opposite side. The top wall 43 of the housing extends both over the delivery side portion thereof and over its narrow segmental portion 40. The bottom wall 44, however, extends merely below the latter and is supported as shown upon a pair of U-shaped frame-bars 45 that are secured at their lower ends to the transverse angle bars 33. A vertical, transverse wall 46 depends from the inner edge of the bottom wall 44 and is secured to one of the transverse angle-bars 33. The lower edge of the segmental, delivery side wall 26 is secured to a correspondingly shaped bar 47 that is fixed at its ends to one of the transverse bars 33 and centrally to a transverse angle-bar 48.

The bottom wall 44 of the housing is provided with an opening within which the beveled gear 28 is arranged and the top wall 43 of the housing is provided with an opening 49 on one side of and adjacent the center of the distributer disk 22 and which opening communicates with a feed hopper 50. This feed hopper is located at the inner end of a conveyer tube 51 which is supported at its inner end upon a bracket 52 and at its outer end upon the upper end of a grain elevator 53. This is the usual grain elevator of the separator or threshing machine and receives the grain from the sieve thereof and delivers it to the outer end of the conveyer tube 51. This tube is provided with a screw 54 that is driven from the upper shaft of the grain elevator by a pair of intermeshing gears 55 and delivers the grain to the hopper 50.

The opening 49 at the bottom of the hopper is preferably controlled by an adjustable slide 56 which has a beveled inner edge and is held in adjusted position by a set screw 57 extending through a longitudinal slot 58 therein. By adjusting this slide, heavy grain, such as wheat or rye, is delivered nearer to the center of the disk and light grain, such as oats or barley, farther away from the center and nearer the periphery thereof. While not absolutely essential, this adjusting slide is effective for obtaining even distribution of different kinds of grain. When the slide is once set in position for any particular kind of grain, the distributer disk 22 and the delivery side wall 26 having the deflective strips or plates 27 thereon, will coöperate to spread or distribute the grain for substantially the full width of the sieve in an even manner, so that the sieves and fan can act to effectively clean the same. The distributing apparatus requires little or no attention or adjustment and will act to uniformly distribute the grain in spite of varying conditions as to its weight and dampness and in spite of the varying amount delivered to the recleaner from time to time by the grain elevator of the threshing machine.

The grain is thrown with considerable force against the baffle plate or wall 26, so that "smut balls," "white caps" and pieces of dirt in the grain are broken up and the grain can thus be subsequently more effectively cleaned in the recleaner shoe.

The edge of the distributer disk 22 is arranged closely adjacent the wall of the narrow segmental portion 40 of the house, so that the disk with the vanes 23 thereon has a fan-like action and any grain lodging in this narrow portion will be swept therefrom into the sieve. The fan-like action of the disk also assists in drawing the grain into the housing. To aid in keeping the narrow portion 40 of the housing clear, the disk 22 is preferably provided on its under side with one or two ribs 59.

It is obvious that numerous changes can be made in the details set forth without departure from the essentials of the invention as defined in the claims.

I claim as my invention:—

1. In a grain recleaner for threshing machines, the combination with the grain cleaning mechanism, of a centrifugal distributer disk, a baffle plate against which the grain is projected by said disk, said plate being arranged on one side only of said disk and extending transversely above the cleaning mechanism to deliver the grain thereto, and means for feeding the grain to said disk in one side of the center thereof, whereby the grain is projected from one side only of said disk against said baffle plate, substantially as described.

2. In a grain recleaner for threshing machines, the combination with the cleaner sieve, of a horizontal, centrifugal distributer disk having ribs on its upper face, mechanism for rotating said disk, a baffle plate on one side only of said disk and against which the grain is projected thereby, said baffle plate having a series of deflectors extending above the plane of said disk and said plate extending transversely above the front end of said sieve to distribute the grain thereon and means for feeding the grain to said disk on one side of its center, substantially as described.

3. In a grain recleaner for threshing machines, the combination with the grain cleaning mechanism, of a horizontal, centrifugal distributer disk having ribs on its upper face slightly inclined to the direction of rotation, mechanism for driving said disk, a vertical baffle plate on one side only of said disk and over which the grain is distributed thereby, said plate having a series of deflectors extending above the plane of the upper working face of said disk and said plate extending transversely above said cleaning mechanism to deliver the grain thereto, and conveyer mechanism for feeding the grain to the disk on one side of its center, substantially as described.

4. In a grain recleaner for threshing machines, the combination with the cleaner sieve, of a horizontal, centrifugal distributer disk having a ribbed upper face, mechanism for rotating said disk, a vertical, segmental baffle plate on one side only of said disk and against which the grain is projected from one side of said disk, said baffle plate having a series of deflectors extending above the plane of said disk and extending transversely above the front end of said sieve to direct the grain thereto, and means for feeding the grain to said disk on one side of its center, substantially as described.

5. In a grain recleaner for threshing machines, the combination with the grain cleaning mechanism, of a horizontal, centrifugal distributer disk, having a ribbed upper face, a baffle plate on one side only of said disk and against which the grain is projected from one side of said disk, said baffle plate extending transversely above the grain cleaner mechanism to direct the grain thereto, conveyer mechanism for feeding the grain to said disk on one side of and adjacent its center, and an adjustable slide for varying the point of admission of the grain to and from the center of said disk, substantially as described.

6. In a grain recleaner for threshing machines, the combination with a cleaner sieve, a horizontal, centrifugal distributer disk having a ribbed upper face, mechanism for rotating said disk, housing for said disk open at its bottom on its delivery side and having a transverse delivery side wall forming a baffle plate on one side only of said disk and against which the grain is projected thereby, said baffle plate having a series of deflectors arranged in line with the upper face of said disk, and said plate extending above the front end of said sieve to distribute the grain thereon, and means for feeding the grain to said disk on one side of its center, whereby the grain is projected from one side of said disk only against said baffle plate, substantially as described.

7. In a grain recleaner for threshing machines, the combination with the grain cleaning mechanism, of a horizontal, centrifugal distributer disk having a series of ribs on its upper face slightly inclined to the direction of rotation, a housing for said disk open at its bottom on its delivery side only and having a vertically disposed segmental delivery side wall forming a baffle plate against which the grain is projected by said disk, said delivery side wall having a series of inwardly projecting, vertical deflecting strips arranged in line with the upper working face of said disk, and said plate, and extending transversely above the grain cleaning mechanism to deliver the grain thereto, and means for feeding the grain to the disk on one side of and adjacent its center, substantially as described.

8. In a grain recleaner for threshing machines, the combination with the cleaner sieve, of a horizontal, centrifugal distributer disk having a ribbed upper face, mechanism for rotating said disk, housing for said disk open at its bottom on the delivery side only and having a delivery side wall provided with a series of deflectors on its face and forming a baffle plate against which the grain is projected by said disk, said delivery side wall extending transversely above the front end of said sieve to direct the grain thereto and said deflectors being arranged in line with the upper working face of said disk, a feed hopper above said disk on one side of and adjacent its center, and conveyer mechanism for delivering the grain to said hopper, substantially as described.

9. In a grain recleaner for threshing machines, the combination with the grain cleaning mechanism, of a horizontal, centrifugal distributer disk having a ribbed upper face, mechanism for rotating said disk, a housing having a narrow segmental portion on one side within which said disk is fitted and a delivery wall on its opposite side forming a baffle plate against which the grain is projected by said disk, said delivery side wall having a series of deflectors on its face and extending transversely above the front end of said sieve to direct the grain thereto, and means for feeding the grain to said disk on one side of and adjacent its center, substantially as described.

ALVA C. FOSTER.

Witnesses:
  WALLACE F. MACGREGOR,
  JOHN MAINLAND.

---

Copies of this patent may be obtained for five cents each, by addressing the "Commissioner of Patents, Washington, D. C."